United States Patent
Henkes

(10) Patent No.: US 12,105,707 B2
(45) Date of Patent: Oct. 1, 2024

(54) TRANSFORMATION OF PROPERTY-VALUE TABLE TO FACILITATE SEARCH

(71) Applicant: SAP SE, Walldorf (DE)

(72) Inventor: Dietmar Henkes, Schwetzingen (DE)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 17/452,814

(22) Filed: Oct. 29, 2021

(65) Prior Publication Data
US 2023/0138283 A1    May 4, 2023

(51) Int. Cl.
*G06F 16/24*     (2019.01)
*G06F 16/22*     (2019.01)
*G06F 16/2453*   (2019.01)

(52) U.S. Cl.
CPC ...... *G06F 16/24544* (2019.01); *G06F 16/221* (2019.01); *G06F 16/2282* (2019.01)

(58) Field of Classification Search
CPC ............................................... G06F 16/24544
USPC ......................................................... 707/769
See application file for complete search history.

(56) References Cited

U.S. PATENT DOCUMENTS

2020/0250190 A1 *  8/2020  Yang ..................... G06F 16/258

FOREIGN PATENT DOCUMENTS

EP          2605158 A1 *  6/2013  ........... G06F 16/221

* cited by examiner

*Primary Examiner* — Syling Yen
(74) *Attorney, Agent, or Firm* — Buckley, Maschoff & Talwalkar LLC

(57) ABSTRACT

A system includes identification of first distinct values of a key column of a property-value table, creation of a new table including a new key column, the new key column populated with only one of each of the identified distinct values, identification of second distinct values of a property column of the property-value table, creation of one property column of the new table for each of the identified second distinct values, population of each cell of the property columns with a value of the property-value table, and, after population of each cell of the property columns, performance of a search on the new table.

18 Claims, 8 Drawing Sheets

| Person_Id | Property | Char_Value | Num_Value |
|---|---|---|---|
| Marie.Gardin@univers.com | favorite_color | blue | |
| Marie.Gardin@univers.com | shirt_size | L | |
| Horst.Richter@all.com | shoe_size | | 8 |
| Horst.Richter@all.com | shirt_size | XL | |
| Horst.Richter@all.com | favorite_color | black | |
| Anne.Miller@now.us | shoe_size | | 6 |
| Anne.Miller@now.us | shirt_size | M | |
| Anne.Miller@now.us | favorite_color | red | |
| Francois.Ledoux@23.com | shoe_size | | 7.5 |
| Francois.Ledoux@23.com | shirt_size | M | |
| Francois.Ledoux@23.com | favorite_color | blue | |

Transformation

| Person_Id | shoe_size | shirt_size | favorite_color |
|---|---|---|---|
| Marie.Gardin@univers.com | --- | L | blue |
| Horst.Richter@all.com | 8 | XL | black |
| Anne.Miller@now.us | 6 | M | red |
| Francois.Ledoux@23.com | 7.5 | M | blue |

| Person_Id | Surname | City | Street |
|---|---|---|---|
| Marie.Gardin@univers.com | Gardin | Paris | Rue Du Jour |
| Horst.Richter@all.com | Richter | Bonn | Postweg |
| Anne.Miller@now.us | Miller | London | Abbey Road |
| Francois.Ledoux@23.com | Ledoux | Giverny | Rue Albert |

| Person_Id | Property | Char_Value | Num_Value |
|---|---|---|---|
| Marie.Gardin@univers.com | favorite_color | blue | |
| Marie.Gardin@univers.com | shirt_size | L | |
| Horst.Richter@all.com | shoe_size | | 8 |
| Horst.Richter@all.com | shirt_size | XL | |
| Horst.Richter@all.com | favorite_color | black | |
| Anne.Miller@now.us | shoe_size | | 6 |
| Anne.Miller@now.us | shirt_size | M | |
| Anne.Miller@now.us | favorite_color | red | |
| Francois.Ledoux@23.com | shoe_size | | 7.5 |
| Francois.Ledoux@23.com | shirt_size | M | |
| Francois.Ledoux@23.com | favorite_color | blue | |

| Person_Id | Property | Char_Value | Num_Value |
|---|---|---|---|
| Marie.Gardin@univers.com | favorite_color | blue | |
| Marie.Gardin@univers.com | shirt_size | L | |
| Horst.Richter@all.com | shoe_size | | 8 |
| Horst.Richter@all.com | shirt_size | XL | |
| Horst.Richter@all.com | favorite_color | black | |
| Anne.Miller@now.us | shoe_size | | 6 |
| Anne.Miller@now.us | shirt_size | M | |
| Anne.Miller@now.us | favorite_color | red | |
| Francois.Ledoux@23.com | shoe_size | | 7.5 |
| Francois.Ledoux@23.com | shirt_size | M | |
| Francois.Ledoux@23.com | favorite_color | blue | |

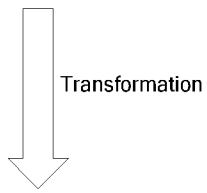

Transformation

210

| Person_Id | shoe_size | shirt_size | favorite_color |
|---|---|---|---|
| Marie.Gardin@univers.com | --- | L | blue |
| Horst.Richter@all.com | 8 | XL | black |
| Anne.Miller@now.us | 6 | M | red |
| Francois.Ledoux@23.com | 7.5 | M | blue |

*FIG. 2*

|   | 310 |
|---|---|
| 0 | Marie.Gardin@univers.com |
|   | --- |
|   | L |
|   | blue |
| 1 | Horst.Richter@all.com |
|   | 8 |
|   | XL |
|   | black |
| 2 | Anne.Miller@now.us |
|   | 6 |
|   | M |
|   | red |
| 3 | Francois.Ledoux@23.com |
|   | 7.5 |
|   | M |
|   | blue |

| favorite_color | row |
|---|---|
| blue | 0, 3 |
| black | 1 |
| red | 2 |

| |
|---|
| Marie.Gardin@univers.com |
| Horst.Richter@all.com8 |
| Anne.Miller@now.usl |
| Francois.Ledoux@23.com |
| --- |
| 8 |
| 6 |
| 7.5 |
| L |
| XL |
| M |
| M |
| blue |
| black |
| red |
| blue |

FIG. 4

| Person_Id |
|---|
| Marie.Gardin@univers.com |
| Horst.Richter@all.com |
| Anne.Miller@now.us |
| Francois.Ledoux@23.com |

FIG. 7

| Person_Id | shoe_size | shirt_size | favorite_color |
|---|---|---|---|
| Marie.Gardin@univers.com | | | |
| Horst.Richter@all.com | | | |
| Anne.Miller@now.us | | | |
| Francois.Ledoux@23.com | | | |

FIG. 8

| Person_Id | Property | Char_Value | Num_Value |
|---|---|---|---|
| Marie.Gardin@univers.com | favorite_color | blue | |
| Marie.Gardin@univers.com | shirt_size | L | |
| Marie.Gardin@univers.com | gender | female | |
| Horst.Richter@all.com | shoe_size | | 8 |
| Horst.Richter@all.com | shirt_size | XL | |
| Horst.Richter@all.com | gender | male | |
| Horst.Richter@all.com | favorite_color | black | |
| Anne.Miller@now.us | shoe_size | | 6 |
| Anne.Miller@now.us | shirt_size | M | |
| Anne.Miller@now.us | favorite_color | red | |
| Anne.Miller@now.us | gender | female | |
| Francois.Ledoux@23.com | shoe_size | | 7.5 |
| Francois.Ledoux@23.com | shirt_size | M | |
| Francois.Ledoux@23.com | favorite_color | blue | |
| Francois.Ledoux@23.com | gender | male | |

FIG. 9

| Person_Id | shoe_size | shirt_size | favorite_color | gender |
|---|---|---|---|---|
| Marie.Gardin@univers.com | --- | L | blue | female |
| Horst.Richter@all.com | 8 | XL | black | male |
| Anne.Miller@now.us | 6 | M | red | female |
| Francois.Ledoux@23.com | 7.5 | M | blue | male |

FIG. 10

TRANSFORMATION OF PROPERTY-VALUE TABLE TO FACILITATE SEARCH

BACKGROUND

Traditional computing system architectures include one or more servers executing applications which access data stored in one or more database systems. Users interact with an application to view, create and update the data in accordance with functionality provided by the application. The data may conform to an application-specific schema and the servers may be located on-premise and/or in a cloud-based datacenter.

Modern applications allow customization of many aspects, including but not limited to user interfaces, terminology and data schemas. For example, a third-party developer or customer may change the schema of a database table defined by an application (e.g., by adding a column) and then use the application to store data in the thusly-modified database table. Such changes are implemented within a customer-specific namespace, and therefore neither the changed schema nor the data of an added column persist across application upgrades.

In order to address the foregoing, some applications provide a pre-defined "property-value" table which may be used to add properties (i.e., columns) to an associated database table. FIG. 1 illustrates an example of masterdata table 110 and associated property-value table 120. Each row of masterdata table 110 provides, for a given key (i.e., Person_Id), a value for each of properties Surname, City and Street. In contrast, each row of property-value table 120 specifies, for a given key, a particular Property and a corresponding Char_Value or Num_Value. As shown, each row includes either a corresponding Char_Value or a corresponding Num_Value, depending on the data type of the inserted value.

Property-value table 120 includes a key column which corresponds to the key column of table 110. Property-value table 120 therefore allows key-based joins with table 110. For example, selection of "Marie.Gardin@univers.com" results in simple retrieval of corresponding values for each of properties Surname, City, Street, favorite_color and shirt_size. Moreover, properties may be added to property-value table 120 by adding corresponding rows, rather than by changing the schema of table 120. Since the addition (or deletion) of a property does not change the schema of property-value table 120 (or of table 110), data stored in tables 110 and 120 may persist across upgrades of the corresponding application.

Property-value table 120 may present difficulties during search operations, particularly in searches for keys corresponding to specific property values. Since all values are stored in a single column, neither conventional indexing nor column-based search can be employed. Instead, to determine all keys associated with favorite_color=blue, each row of table 120 must be individually examined to identify those rows in which Property=favorite_color and Char_Value=blue. Such a determination is resource-intensive and relatively slow, particularly as the size of property-value table 120 grows. The resource demand and performance hit further increases in the case of a search for all keys associated with a specific value of more than one property, including properties existing in table 110 and in table 120.

Improved systems for implementing a property-value table within a database system are desired.

BRIEF DESCRIPTION OF THE DRAWINGS

FIG. 1 illustrates a database table and an associated property-value table.

FIG. 2 includes tabular representations of a property-value table and a transformed property-value table generated based on the property-value table according to some embodiments.

FIG. 3 illustrates row-based storage of a transformed property-value table and an index according to some embodiments.

FIG. 4 illustrates column-based storage of a transformed property-value table according to some embodiments.

FIG. 7 is a tabular representation of a table during transformation of a property-value table according to some embodiments.

FIG. 8 is a tabular representation of a table during transformation of a property-value table according to some embodiments.

FIG. 9 is a tabular representation of a property-value table to which a property "gender" has been added according to some embodiments.

FIG. 10 is a tabular representation of a transformed property-value table generated based on the property-value table of FIG. 9 according to some embodiments.

DETAILED DESCRIPTION

Figure 5:
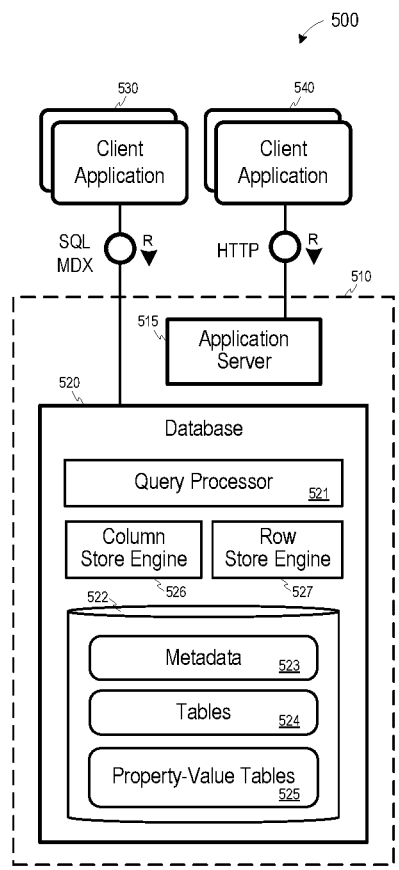
FIG. 5 is a block diagram of a database system according to some embodiments.

The following description is provided to enable any person in the art to make and use the described embodiments and sets forth the best mode contemplated for carrying out some embodiments. Various modifications, however, will be readily apparent to those in the art.

Some embodiments address the foregoing by transforming a property-value table associated with a "standard" table into a transformed property-value table and then using the transformed property-value table to perform searches. The transformed property-value table includes one column for each property of the property-value table and one row for each key of the property-value table. Accordingly, the columns of the transformed property-value table may be indexed to facilitate searches thereof and, if stored in a column store, may be subjected to column-based search. Moreover, the transformed property-value table may be joined with the standard table based on the key column(s) to facilitate combined searches thereof.

Property-value tables and associated standard tables of a database system may be updated during operation of the database system as usual, with transformation of property-value tables as described herein occurring periodically, e.g., nightly or at initial load. The period may differ for different property-value tables, and, in some embodiments, only specific property-value tables are transformed as described. Transformed property-value tables may be stored in memory and/or may be persisted in the database system.

FIG. 2 illustrates property-value table 120 of FIG. 1. As depicted, embodiments may apply a transformation to property-value table 120 to generate transformed property-value table 210. The process of such a transformation according to some embodiments will be described below. Transformed property-value table 210 includes key column Person_Id of property-value table 120. In addition, transformed property-value table 210 includes one column for each of the properties (i.e., shoe_size, shirt_size, favorite_color) listed in Property column of property-value table 120. FIG. 2 depicts an example of a property-value table and a corresponding transformed property-value table, embodiments are not limited to any particular number of key columns and/or properties.

The non-key columns of transformed property-value table 210 are populated with the values of the Char_Value and Num_Value columns of property-value table 120. In particular, each cell of the non-key columns of transformed property-value table 210 is populated with the character value or numeric value of table 120 within the row including the key and property of the cell.

Transformed property-value table 210 may be designated as a search table associated with the properties of property-value table 120. For example, a search for keys associated with shirt_size=M may refer to an index based on the shirt_size column of transformed property-value table 210. Alternatively, in a column store implementation, such a search may simply search stored memory locations associated with the shirt_size column of transformed property-value table 210.

FIG. 3 illustrates contiguous memory locations 310 storing rows of transformed property-value table 210 in a row-based format according to some embodiments. The values of each row are stored in contiguous order. For clarity, FIG. 3 depicts a row index adjacent to a corresponding a key value of each row.

Due to potential performance issues with searching values of a given column in a row-based storage, an index such as index 320 may be provided. Index 320 is an index on the favorite_color column of transformed property-value table 210. As is known in the art, index 320 associates each distinct value of the indexed column with the row indices of the row(s) which include the value. Accordingly, index 320 provides efficient determination of the row(s) in which a given value resides. Indices such as index 320 may be continuously or periodically updated, and may be generated for any specified database table columns.

FIG. 4 illustrates contiguous memory locations 410 storing rows of transformed property-value table 210 in a column-based format according to some embodiments. In contrast to memory locations 310, the values of each column are stored in contiguous order. Since memory locations 410 store the same row values as memory locations 310, index 320 on the favorite_color column may also be used to search the favorite_color column as stored in memory locations 410. However, due to the contiguous storage locations of each value of the favorite_color column in memory locations 410, it may in some embodiments be more efficient to simply search these contiguous locations rather than incurring the overhead of maintaining index 320.

It is noted that the values stored in memory locations 310 and memory locations 410 may be stored using any suitable compression, including but not limited to dictionary compression, bit compression, and, in the case of columnar storage, Run-Length Encoding, prefix encoding, cluster encoding, indirect encoding and sparse encoding, for example.

FIG. 5 is a block diagram of a database system according to some embodiments. The illustrated elements of system 500 may be implemented using any suitable combination of computing hardware and/or software that is or becomes known. System 500 may comprise components of a database system. In some embodiments, two or more elements of system 500 are implemented by a single computing device. One or more elements of system 500 may be implemented as a cloud service (e.g., Software-as-a-Service, Platform-as-a-Service).

Server node 510 includes application server 515 and database 520. Some embodiments may provide one or more servers implementing application server 515 and a separate one or more servers implementing database 520.

Server node 510 may receive a query from one of client applications 530 and 540 and return results thereto based on data stored within server node 510. Application server 515 provides services for executing server applications. For example, Web applications executing on application server 515 may receive Hypertext Transfer Protocol (HTTP) requests from client applications 540 as shown in FIG. 5.

Database 520 includes various database components such as query processor 521, which may comprise any suitable query processor that is or becomes known. Generally, query processor 521 receives a query from a client, determines a query execution plan to execute the query, executes the plan to produce a result set, and provides the result set to a client. Query processor 521 may also be responsible for processing Structured Query Language (SQL) and Multi-Dimensional eXpression (MDX) statements and may receive such statements directly from client applications 530.

The data of storage 522 may comprise one or more of conventional tabular data, row-stored data, column-stored data, and object-based data. Moreover, the data may be indexed and/or selectively replicated in an index to allow fast searching and retrieval thereof. Server node 510 may support multi-tenancy to separately support multiple unrelated clients by providing multiple logical database systems which are programmatically isolated from one another.

Metadata 523 includes data describing a database schema to which tables 524 and property-value tables 525 conform. Metadata 523 may therefore describe associations between a table 524 and a corresponding property-value table 525, columns and properties of tables 524/525, the properties of each column of each table 524, the interrelations between the columns, and any other suitable information. In one example, metadata 523 identifies a transformed property-value table as being associated with one of property-value tables 525 and as a search target for the properties of the property-value table 525.

Database 520 may implement storage 522 as an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Database 520 includes column store engine 526 and row store engine 527. Column store engine 526 manages column-stored tabular data and row store engine 527 manages row-stored tabular data as is known in the art. Data managed by column store engine 526 or by row store engine 527 may be retrieved or modified in response to requests received from query processor 521. According to some embodiments, column store engine 526 includes in-memory representations of delta column fragments and main column fragments. According to some embodiments, new main column fragments are constructed by column store engine 526, persisted to tables 524 of storage 522, and read therefrom by column store engine 526.

Figure 6:
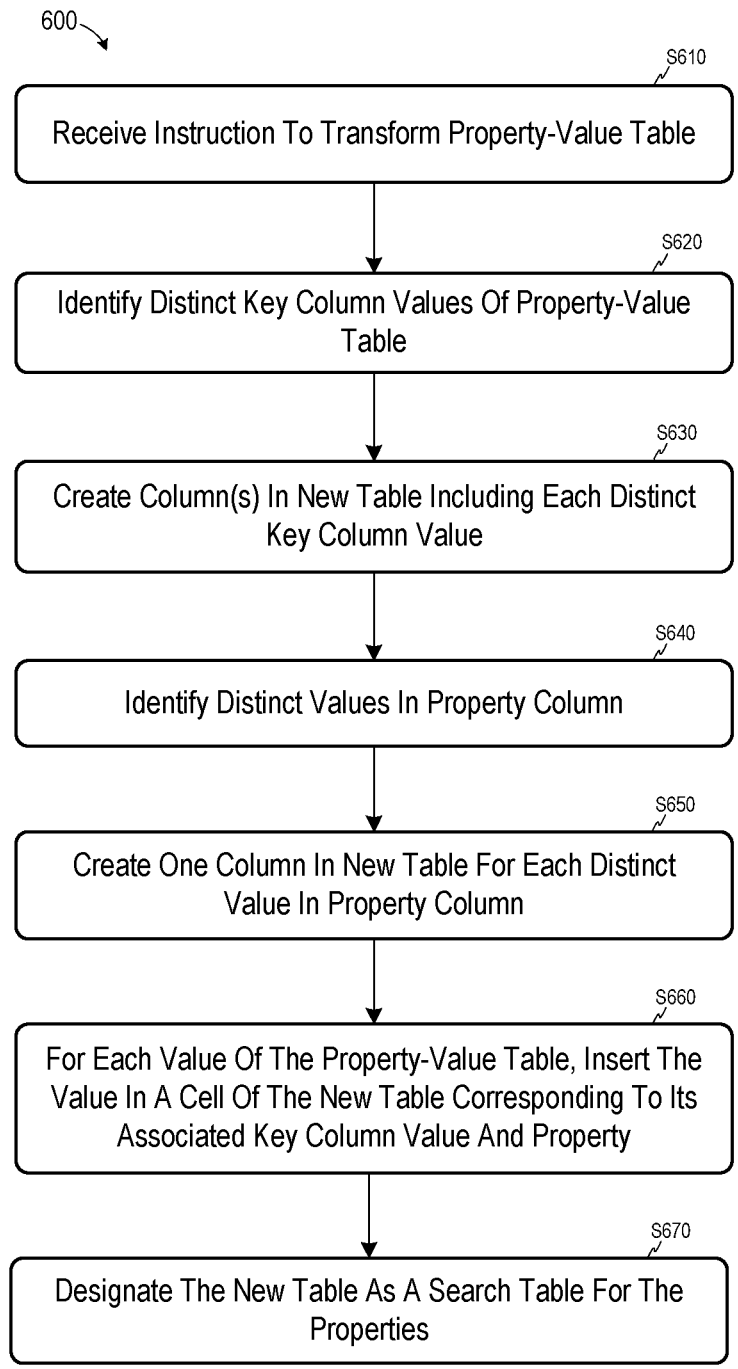
FIG. 6 comprises a flow diagram to transform a property-value table to facilitate search according to some embodiments.

FIG. 6 comprises a flow diagram to transform a property-value table in order to facilitate searching according to some embodiments. In some embodiments, various hardware elements of query processor 521 and/or database 520 execute program code to perform process 600. Process 600 and all other processes mentioned herein may be embodied in computer-executable program code read from one or more non-transitory computer-readable media, such as a hard disk drive, a volatile or non-volatile random access memory, a DVD-ROM, a Flash drive, and a magnetic tape, and may be executed by one or more processing units, including but not limited to hardware processors, processor cores, and processor threads. In some embodiments, hard-wired circuitry may be used in place of, or in combination with, program code for implementation of processes according to some embodiments. Embodiments are therefore not limited to any specific combination of hardware and software.

Initially, at S610, an instruction is received to transform a property-value table. The instruction may be received as part of an initial load, i.e., a process during which all tables of a database are loaded from persistency into volatile memory. Such a process may also comprise the building of desired indices and any other database initialization activities that are or become known. Database metadata may identify the property-value tables of a database which should be transformed at initial load.

The instruction may be received at S610 based on a determination of a change to the property-value table. For example, it may be determined to transform a property-value table in response to the addition of two new properties to the table. In another example, the instruction received at S610 may be triggered by the amount of time elapsed since a last transformation of the property-value table, or by the current time (i.e., every weeknight at 2 am). Although the transformation of a single property-value table is described below, it should be noted that, particularly at initial load, the instruction may comprise an instruction to transform more than one property-value table.

Next, in response to the received instruction, distinct key column values of the property-value table are identified at S620. As described above, a property-value table includes one or more key columns. Each unique key value of the key column(s) is identified at S620. With respect to property-value table 120, the distinct key column values identified at S620 are: "Marie.Gardin@univers.com", "Horst.Richter@all.com", "Anne.Miller@now.us", and "Francois.Ledoux@23.com".

At S630, one or more key columns of a new table are created which includes each distinct key column value identified at S620. Continuing the present example, FIG. 7 illustrates new table 710 created at S630 according to some embodiments.

At S640, distinct values in the Property column of the property-value table are identified. In the present example, the distinct values are "shoe_size", "shirt_size" and "favorite_color". Next, at S650, one column is created in the new table for each of the identified distinct values in the Property column. Each created column is associated with a data type which corresponds to the data type of the values which will populate the column. FIG. 8 illustrates such changes as applied to table 710, in which a column has been added corresponding to each of "shoe_size", "shirt_size" and "favorite_color". The data type of the "shoe_size" column is a numeric data type, the data type of the "shirt_size" column is a character data type and data type of the "favorite_color" column is a character data type.

Each value of the property-value table is then inserted into a corresponding cell of the new table at S660. Each value of the property-value table is associated with a property and a key. Accordingly, a value of a row the property-value table is inserted in the cell of the new table which is associated with the same property and key as the value.

The new table (i.e., the transformed property-value table) is designated as the search table for its properties at S670. Such a designation may be reflected in the metadata of the database system. In some embodiments, any search to be conducted on a property-value table initially determines whether a corresponding transformed property-value table exists, and, if so, the search is performed on the transformed property-value table.

The steps of process 600 may be performed in some embodiments via SQL procedures executed by a query processor. For example, assuming a property-value table named AUSP with key Person_Id, a new table TF_AUSP may be created at S630 using the following procedure:

```
Begin
  create column table TF_AUSP (Person_Id NVARCHAR(50), primary key(Person_Id));
  Declare cursor c_cursor1
  select distinct Person_Id from AUSP
  FOR c_row as c_cursor1 DO
  INSERT INTO TF_AUSP( Person_Id ) VALUES
  ( c_row_ Person_Id) ;.
  END FOR;
END ;
```

Moreover, S650 may be performed using:

```
Begin
// Create columns for values of type CHARACTER
  Declare cursor c_cursor1
  select distinct PROPERTY from AUSP where CHAR_VALUE < > initial
  FOR c_row as c_cursor1 DO
  alter table TF_AUSP add ( c_row.PROPERTY NVARCHAR(30) );
  END FOR;
// Create columns for values of type NUMERIC
  Declare cursor c_cursor2
  select distinct PROPERTY from AUSP where CHAR_VALUE = = initial
  FOR c_row as c_cursor2 DO
  alter table TF_AUSP add ( c_row.PROPERTY DOUBLE );
  END FOR;
END ;
```

Finally, S660 may be performed by executing:

```
Begin
// Update columns for values of type CHARACTER
  Declare cursor c_cursor1
  select OBJEK , PROPERTY , VALUE from AUSP where CHAR_VALUE < > initial
  FOR c_row as c_cursor1
  DO
  UPDATE TF_AUSP SET c_row.property = c_row.value WHERE OBJEK = c_row_objek;
  END FOR;
// Update columns for values of type NUMERIC
  Declare cursor c_cursor2
  select OBJEK , PROPERTY , NUM_VALUE from AUSP where CHAR_VALUE = = initial
  FOR c_row as c_cursor2
  DO
```

-continued

```
UPDATE TF_AUSP SET c_row.property = c_row.num_value
WHERE OBJEK = c_row_objek;
  END FOR;
END ;
```

As described above, a property-value table may be updated during database operation. These updates are not reflected in a corresponding transformed property-value table until the transformed property-value table is regenerated. Such a limitation may be acceptable for low-velocity data or for reporting/analysis which does not require up-to-date data. In some scenarios, regeneration of a transformed property-value table once per day is sufficient, for example.

For example, FIG. 9 illustrates property-value table 120 to which a property "gender" has been added according to some embodiments. Addition of the property includes addition of a row for each value of the property gender to be added to the table. This property is not reflected in transformed property-value table 210 of FIG. 2. However, at a suitable time, process 600 may be re-executed with respect to updated table 120 of FIG. 9 to generate updated transformed property-value table 220 of FIG. 10. As shown, by virtue of process 600, transformed property-value table 220 of FIG. 10 includes a column associated with the property gender.

Figure 11:
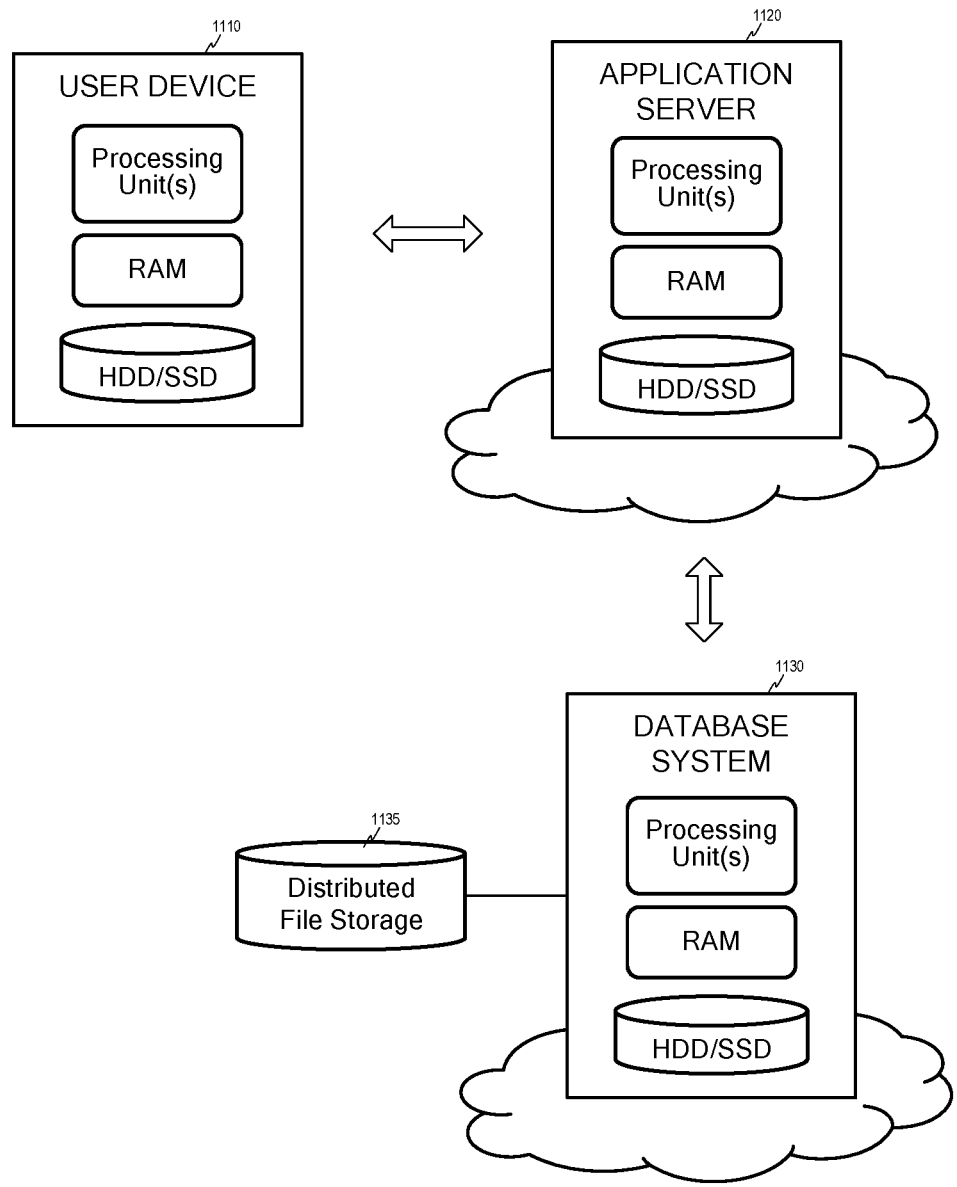
FIG. 11 is a block diagram of a cloud-based database system according to some embodiments.

FIG. 11 is a block diagram of a cloud-based database system according to some embodiments. The illustrated components may reside in one or more public clouds providing self-service and immediate provisioning, autoscaling, security, compliance and identity management features.

User device 1110 may interact with applications executing on application server 1120, for example via a Web Browser executing on user device 1110, in order to create, read, update and delete data managed by database system 1130 and persisted in distributed file storage 1135. Database system 1130 may store data in standard tables and associated property-value tables as described herein and may execute processes as described herein to transform property-value tables to facilitate search. Application server 1120 and/or database system 1130 may comprise cloud-based compute resources, such as virtual machines, allocated by a public cloud provider. As such, application server 1120 and database system 1130 may exhibit demand-based elasticity.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code in order to cause the system to:
identify first distinct values of a key column of a property-value table;
create a new table including a new key column, the new key column populated with only one of each of the identified first distinct values;
identify second distinct values of a property column of the property-value table;
create only one property column of the new table for each of the identified second distinct values;
populate each cell of the property columns with a value of the property-value table associated with the first distinct value of the row of the cell and the second distinct value of the property column of the cell in the property-value table; and
after population of each cell of the property columns:
receive a search query including the property-value table from a requestor computing system;
identify the new table as a search table of the property-value table;
execute the search query on the new table; and
return a result of the executed search query to the requestor computing system via one or more computing networks.

2. A system according to claim 1, wherein population of each cell of the property columns with a value of the property-value table comprises:
determination of a property and a key associated with a value of the property-value table, and population of a cell of the new table associated with the key and the property with the value.

3. A system according to claim 1, the processing unit to execute the processor-executable program code in order to cause the system to:
after population of each cell of the property columns, associate the new table with the property-value table in metadata.

4. A system according to claim 3, wherein association of the new table with the property-value table in metadata comprises designation of the new table as the search table for the second distinct values of the property column of the property-value table.

5. A system according to claim 1, wherein the property-value table is associated with a database table, and the processing unit to execute the processor-executable program code in order to cause the system to:
execute a join between the new table and the database table.

6. A system according to claim 1, the processing unit to execute the processor-executable program code in order to cause the system to:
identify third distinct values of the key column of the property-value table;
create a second new table including a second new key column, the second new key column populated with only one of each of the identified third distinct values;
identify fourth distinct values of the property column of the property-value table;
create only one property column of the second new table for each of the identified fourth distinct values;
populate each cell of the property columns of the second new table with a value of the property-value table associated with the third distinct value of the row of the cell and the fourth distinct value of the property column of the cell in the property-value table; and after population of each cell of the property columns of the second new table, perform a search on the second new table, wherein the fourth distinct values are different from the second distinct values.

7. A computer-implemented method comprising:
identifying first distinct values of a key column of a property-value table;
creating a new table including a new key column, the new key column populated with only one of each of the identified first distinct values;
identifying second distinct values of a property column of the property-value table;
adding only one property column to the new table for each of the identified second distinct values;
populating each cell of the property columns with a value of the property-value table associated with the first distinct value of the row of the cell and the second distinct value of the property column of the cell in the property-value table; and
after populating each cell of the property columns:
receiving a search query including the property-value table from a requestor computing system;
identifying the new table as a search table of the property-value table;
executing the search query on the new table; and
returning a result of the executed search query to the requestor computing system over one or more computing networks.

8. A method according to claim 7, wherein populating each cell of the property columns with a value of the property-value table comprises:
determining a property and a key associated with a value of the property-value table, and populating a cell of the new table associated with the key and the property with the value.

9. A method according to claim 7, further comprising:
after populating each cell of the property columns, associating the new table with the property-value table in metadata.

10. A method according to claim 9, wherein associating the new table with the property-value table in metadata comprises designating the new table as the search table for the second distinct values of the property column of the property-value table.

11. A method according to claim 7, wherein the property-value table is associated with a database table, the method further comprising:
executing a join between the new table and the database table.

12. A method according to claim 7, further comprising:
identifying third distinct values of the key column of the property-value table;
creating a second new table including a second new key column, the second new key column populated with only one of each of the identified third distinct values;
identifying fourth distinct values of the property column of the property-value table;
adding only one property column of the second new table for each of the identified fourth distinct values;
populating each cell of the property columns of the second new table with a value of the property-value table associated with the third distinct value of the row of the cell and the fourth distinct value of the property column of the cell in the property-value table; and after populating each cell of the property columns of the second new table, performing a search using the second new table, wherein the fourth distinct values are different from the second distinct values.

13. A non-transitory medium storing processor-executable program code, the program code executable by a computing system to cause the computing system to:
identify first distinct values of a key column of a property-value table;
create a new table including a new key column, the new key column populated with only one of each of the identified first distinct values;
identify second distinct values of a property column of the property-value table;
create only one property column of the new table for each of the identified second distinct values;
populate each cell of the property columns with a value of the property-value table associated with the first distinct value of the row of the cell and the second distinct value of the property column of the cell in the property-value table; and
after population of each cell of the property columns:
receive a search query including the property-value table from a requestor computing system;
identify the new table as a search table of the property-value table;
execute the search query on the new table; and
return a result of the executed search query to the requestor computing system over one or more computing networks.

14. A medium according to claim 13, wherein population of each cell of the property columns with a value of the property-value table comprises:
determination of a property and a key associated with a value of the property-value table, and population of a cell of the new table associated with the key and the property with the value.

15. A medium according to claim 13, the program code executable by a computing system to cause the computing system to:
after population of each cell of the property columns, associate the new table with the property-value table in metadata.

16. A medium according to claim 15, wherein association of the new table with the property-value table in metadata comprises designation of the new table as the search table for the second distinct values of the property column of the property-value table.

17. A medium according to claim 13, wherein the property-value table is associated with a database table, and the program code executable by a computing system to cause the computing system to:
execute a join between the new table and the database table.

18. A medium according to claim 13, the program code executable by a computing system to cause the computing system to:
identify third distinct values of the key column of the property-value table;
create a second new table including a second new key column, the second new key column populated with only one of each of the identified third distinct values;
identify fourth distinct values of the property column of the property-value table;

create only one property column of the second new table for each of the identified fourth distinct values;
populate each cell of the property columns of the second new table with a value of the property-value table associated with the third distinct value of the row of the cell and the fourth distinct value of the property column of the cell in the property-value table; and
after population of each cell of the property columns of the second new table, perform a search on the second new table,
wherein the fourth distinct values are different from the second distinct values.

* * * * *